United States Patent
Ohguri

[11] Patent Number: 5,825,561
[45] Date of Patent: Oct. 20, 1998

[54] FOCUSING LENS SYSTEM FOR AN OPTICAL HEAD ASSEMBLY

[75] Inventor: Osamu Ohguri, Tokyo, Japan

[73] Assignee: NEC Corporation, Tokyo, Japan

[21] Appl. No.: 772,771

[22] Filed: Dec. 24, 1996

[30] Foreign Application Priority Data

Dec. 26, 1995 [JP] Japan .................................. 7-338706

[51] Int. Cl.$^6$ .................................................. G02B 7/02
[52] U.S. Cl. ............................................................ 359/822
[58] Field of Search .................................. 359/822, 821, 359/823, 824

[56] References Cited

U.S. PATENT DOCUMENTS

| | | | |
|---|---|---|---|
| 4,946,265 | 8/1990 | Shimizu et al. | 359/821 |
| 5,216,531 | 6/1993 | Boardman et al. | 359/209 |
| 5,440,419 | 8/1995 | Boardman et al. | 359/210 |
| 5,687,154 | 11/1997 | Tsuchiya et al. | 369/112 |

FOREIGN PATENT DOCUMENTS

| | | |
|---|---|---|
| 61-177652 | 8/1986 | Japan . |
| 62-109241 | 5/1987 | Japan . |
| 63-122028 | 5/1988 | Japan . |
| 63-146234 | 6/1988 | Japan . |
| 3192525 | 8/1991 | Japan . |

OTHER PUBLICATIONS

Yamamoto, Kenji; Osato, Kiyoshi; Ichimura, Isoa; Maeda, Fumisada; and Watanabe, Toshio, "0.8 Numerical Aperture Two–Element Objective Lens for the Optical Disk", http://wwwsoc.nacsis.ac.jp/jjap/36–1B–1/19631.tex.abst/index.html Jan. 1997.

*Primary Examiner*—Georgia Y. Epps
*Assistant Examiner*—Ricky Mack
*Attorney, Agent, or Firm*—Sughrue, Mion, Zinn, Macpeak & Seas, PLLC

[57] ABSTRACT

A focusing lens system for an optical head has a plurality of objective lenses and a lens actuator including a cylindrical housing and a lens holder rotatably and slidably mounted by a shaft within the cylindrical housing. A switching mechanism selects one of the first and second lens for effecting tracking of the optical head depending on the type of an optical disk. The switching mechanism includes a pair of magnets mounted on the lens holder and a pair of associated coils secured on the inner wall of the cylindrical housing. The lens holder is further driven along the shaft for focusing of the selected lens.

11 Claims, 6 Drawing Sheets

FOCUSING LENS SYSTEM FOR AN OPTICAL HEAD ASSEMBLY

BACKGROUND OF THE INVENTION a. Field of the Invention

The invention relates to a focusing lens system for an optical head assembly, and in particular, to for use in a data storage/reproduction apparatus capable of storing/reproducing data to or from different types of recording disks by switching a plurality of objective lenses.

b. Description of the Related Art

Currently, in a data storage/reproduction apparatus which performs a recording/reproducing information utilizing an optical spot, a lens actuator is used to control the position of a focusing lens along the direction of the optical axis or in a focusing direction so that the focus of the optical spot is maintained on the surface of a recording medium. The lens actuator also executes a tracking control by driving the focusing lens in a radial direction of an optical disk or in a tracking direction so that the optical spot on the recording medium is exactly positioned relative to recording pits formed on the surface of the recording medium in a spiral or concentric circles.

With a recent trend toward an increase in the amount of data and a reduction in the dimension of an optical recording disk, a strong demand is placed on an increased recording capacity of the recording disk. It is not sure that a recording medium having an increased recording density may be attained in which the structure or specification of the recording medium is similar to that of one currently in use or may be attained in which the structure and specification are distinct from those of one currently in use.

Where a higher density recording medium is attained in accordance with a specification which is distinct from that of the current recording medium, it is desirable that the data storage/reproduction operation can be performed on both the current recording medium and the higher density recording medium by a single storage/reproduction apparatus.

However, with a lens actuator generally used in an optical head assembly, data storage/reproduction can only apply to a single type of an optical disk. Specifically, when the recording medium on which data is to be recorded or from which data is to be reproduced has a different thickness, there will be a difference in the aberrations which are attributable to the thickness of the substrate, and such difference prevents the single objective lens from being used to perform data storage/reproduction to or from both types of recording medium.

There are several proposals for a lens actuator having a plurality of objective lenses mounted thereon (see, for example, Patent Publications No. JP-A-1988-146,234, -1988-122,028, -1987-109,241, -1986-177,652). In each of the publications, the plurality of objective lenses are simultaneously used for focusing optical beams upon the surface of the recording medium to perform data storage/reproduction. The objects of these references are to achieve a higher rate seeking operation during the data storage/reproduction.

Disclosed in Japanese Patent Publication No. JP-A-1991-192,525 is an optical head assembly including a plurality of lens actuators each having a single objective lens mounted thereon. In this arrangement, an offset voltage is applied to the lens actuator so that an objective lens or lenses other than a selected one of them are forcibly defocused to diffuse a corresponding optical spot formed on a photodetector so as to enable only the selected one to function for the data storage/reproduction. The lens actuator described in this publication will be described with reference to FIG. 1.

An optical beam from a laser diode 71 is passed through a collimating lens 72 to be incident on a beam splitter 73 where it is split into two beams. One of the optical beams is directed to a first reflecting mirror 74 to be incident on a first objective lens 70a, which in turn irradiates the optical beam on the recording surface 76 of an optical disk 75. Reflected light from the recording surface 76 returns through the optical path including the first reflecting mirror 74, the beam splitter 73, a half wavelength polarizing plate 77, a second reflecting mirror 78, a focusing cylindrical lens 79 and a polarizing beam splitter 80 to impinge upon photodetectors 81 and 82, both connected to a control unit 83 which reproduces a data signal and tracking and focusing error signals.

The other split beam from the beam splitter 73 is directed to a second objective lens 70b, which irradiates the beam to the recording surface 76 of the optical disk 75. Reflected light from the recording surface 76 returns to pass through the beam splitter 73, to impinge upon the photodetectors 81 and 82. The control unit 83 reproduces another data signal and tracking and focusing error signals.

On the basis of the tracking error signal and focusing error signal thus obtained, the control unit 83 drives the first and second objective lens 70a and 70b to enable data storage/reproduction under an optimum optical condition. Other configurations including a drive mechanism, a control mechanism and the like may be similar to those used in the conventional optical recording system. In this type of disk drive, a control voltage is applied to coils associated with the lens actuators 84 and 85 to adjust the distances between the first and the second objective lenses 70a and 70b and the recording surface 76 to allow the optical beams to be focused upon the recording surface 76 or in the vicinity thereof. However, when the signal lights from both the first and the second objective lenses 70a and 70b impinge upon the photodetectors 81 and 82, the optical spots on the photodetectors become defocused, disabling a reproduction of the data signal.

While there are several proposals for using a plurality of objective lenses in a conventional lens actuator, these techniques are directed to achieving a higher rate seeking operation during the data storage/reproduction, and it has been impossible with these techniques to perform a data storage/reproduction to or from a recording medium by using a particular objective lens which is selected from the plurality of objective lenses of different types.

Further, in the prior art arrangement, if it is attempted to perform a data storage/reproduction to or from the entire recording surface by using either one of the objective lenses, for example, the objective lens disposed adjacent to the outer periphery of the disk, a physical interference of the objective lens with a spindle motor which is used to drive the disk for rotation prevents data storage/reproduction to or from the region located adjacent to the inner periphery of the disk.

It has also been impossible to perform a data storage/reproduction to or from recording disks of different types, such as a currently available CD and a high recording density CD, for example, using a single apparatus.

SUMMARY OF THE INVENTION

It is an object of the invention to provide a focusing lens system for use in an optical head assembly which solves the described problems and which enable a data storage/ reproduction to or from a plurality of different types of recording media, such as a currently available CD and a high recording density CD, by using a single data storage/reproduction apparatus.

In accordance with the invention, there is provided a focusing lens system comprising: first and second objective lenses for irradiating an optical beam from a light source to an optical disk, the first and second objective lenses having different optical characteristics from each other; a lens holder for mounting thereon the first and second objective lenses; and switching means for switching the first and second objective lens to select one of the first and second objective lens for passing therethrough an optical beam from the light source.

In accordance with the focusing lens system of the present invention, one of a plurality of objective lenses is selected which is suitable to a particular one of a plurality of optical disks of different types, thereby enabling a suitable data storage/reproduction. The plurality of objective lenses are mounted on a single lens actuator, whereby a data storage/reproduction to or from a plurality of optical disks of different types can be achieved by a single storage/reproduction apparatus.

The above and other objects, features and advantages of the present invention will be more apparent from the following description, referring to the accompanying drawings.

DESCRIPTION OF THE PREFERED EMBODIMENT

A preferred embodiment of the invention and modifications thereof will now be described.

Figure 1:
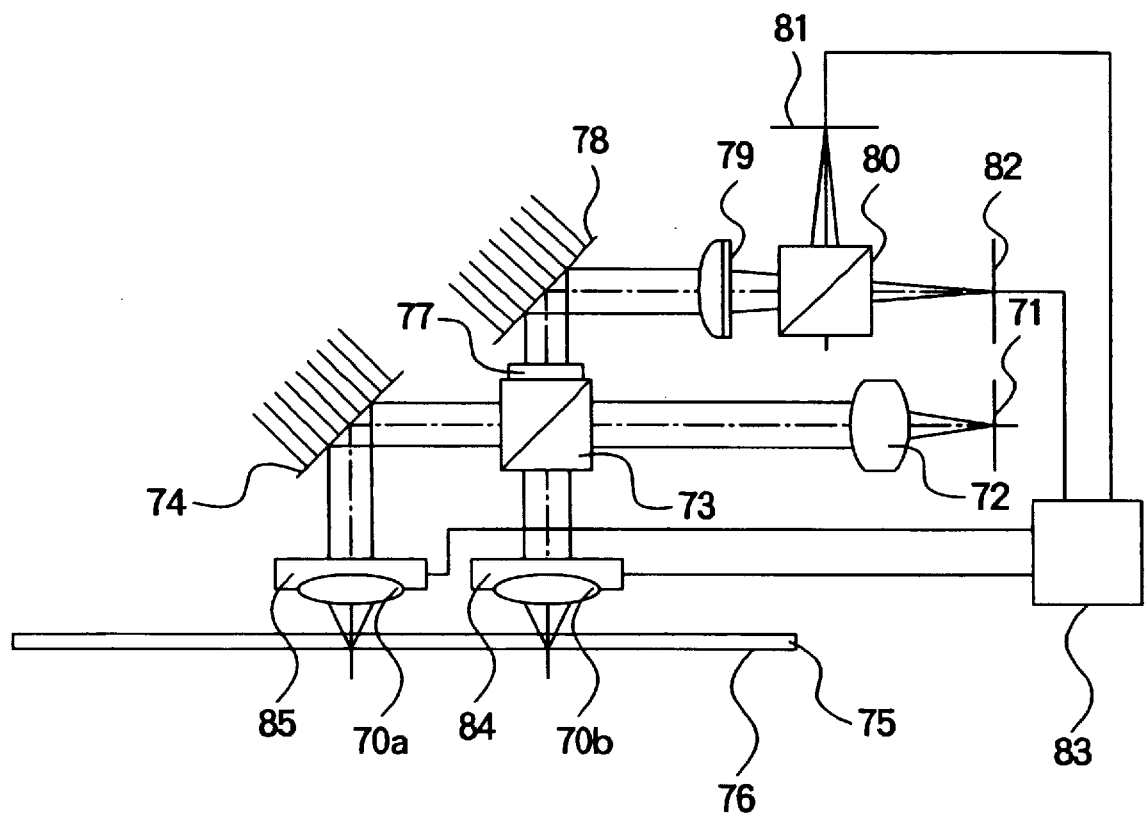
FIG. 1 is a schematic side view of a conventional focusing lens system.
Figure 2:
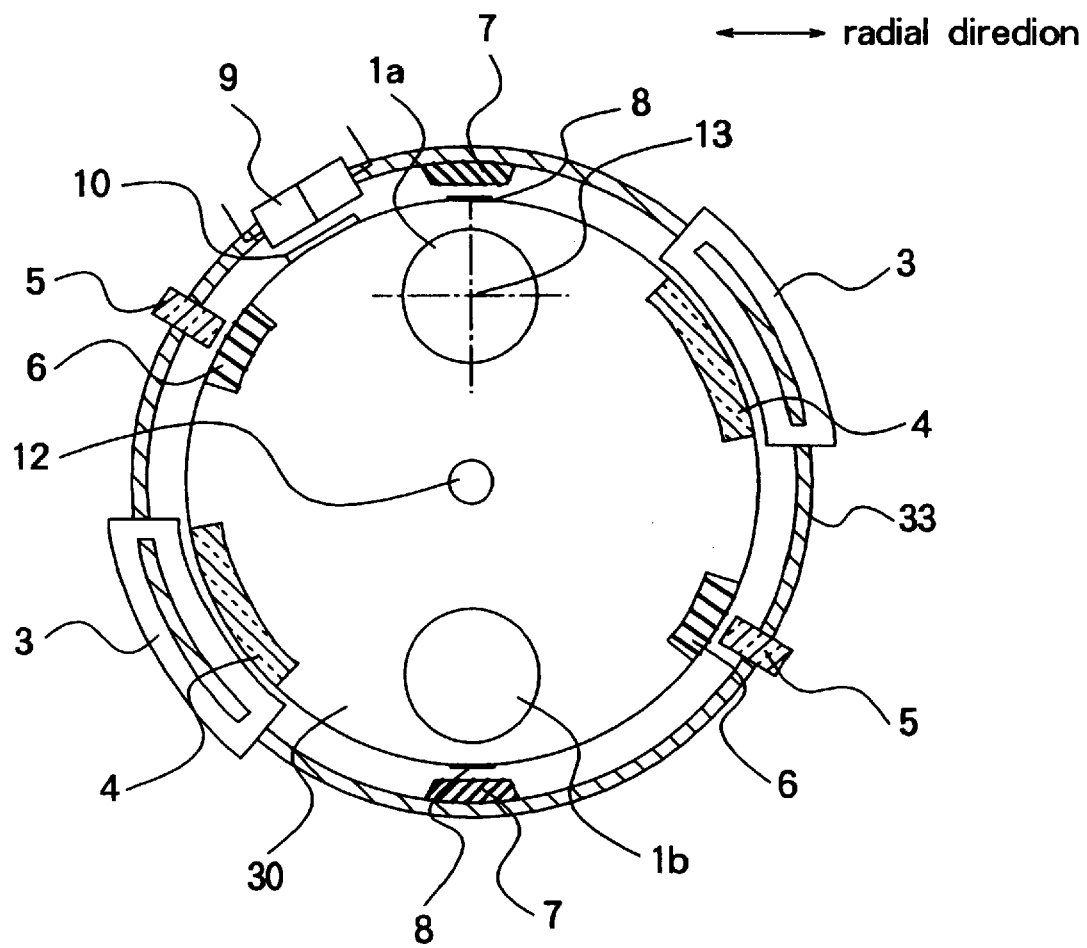
FIG. 2 is a plan view of a lens actuator in a focusing lens system according to an embodiment of the invention.

Referring first to FIG. 2, a lens actuator in a focusing lens system according to the preferred embodiment of the invention has a disk-shaped lens holder 30 rotatably and slidably mounted within a coaxial cylindrical housing 33 by a sliding shaft 12. The lens holder 30 mounts at the peripheral edge thereof a pair of objective lens, i.e., a first objective lens 1a and a second objective lens 1b, a pair of magnetic pieces 8 formed of a magnetic material, a pair of tracking magnets 6, a pair of focusing magnets 4 and a reflecting plate 10. Each of the pairs of magnets 4 and 6 are arranged diametrically opposite to each other, like the pair of magnetic pieces 8.

On the inner surface of the cylindrical housing 33, there are provided a pair of neutral magnets 7, a pair of tracking coils 5, a pair of focusing coil 3 and a reflective photo-sensor 9, which are associated with the pair of magnetic pieces 8, pair of tracking magnets 9, pair of focusing magnets and reflecting plate 10 on the lens holder 30. The pair of neutral magnets 7 and associated magnet pieces 8 function for aligning the first or second objective lens 1a or 1b with an optical axis 13 of a light source not shown by a snapping or pull-in function.

Figure 3:
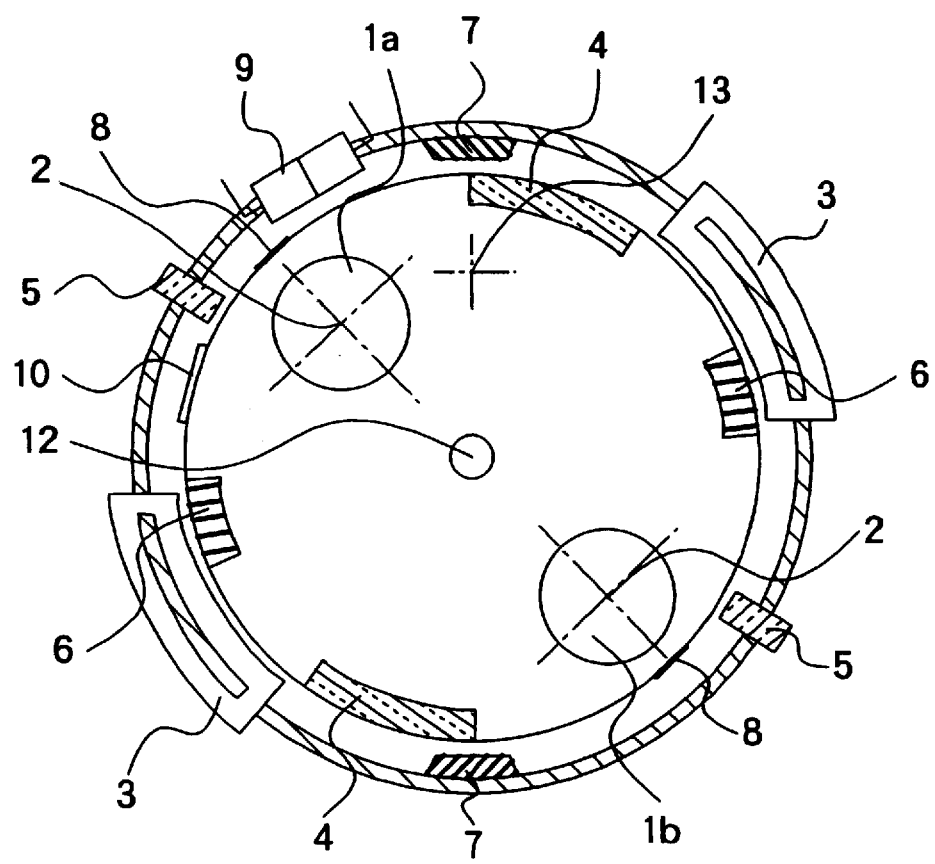
FIG. 3. is another plan view of the lens actuator of FIG. 2 in a different state thereof, for showing a switching operation of the objective lenses.

The lens actuator of FIG. 2 is retained in its first state wherein the first objective lens 1a is aligned with an optical axis 13 of a light source for selecting the first objective lens 1a. The lens actuator is also shown in its neutral position for the first state where a precise coincidence is reached between the optical axis of the first objective lens 1a and the optical axis 13 of the light source by means of the pair of neutral magnets 7 and associated magnetic pieces 8. The neutral position as used herein means a central position of the objective lens 1a or 1b as viewed in the radial direction of a recording disk, which is a horizontal direction as viewed in FIG. 2 and which is the direction of surface oscillation of the recording disk caused by eccentricity of the disk. FIG. 3 shows the lens actuator of FIG. 2 wherein the lens holder 30 is slightly rotated in a counter clock-wise direction from the first state in the way of switching from the first state to a second state in which the optical axis of the second objective lens 1b is aligned with the optical axis 13 of the light source.

In the present embodiment, the actuator of a moving magnet type is employed in which the pair of focusing magnets 4 and pair of tracking magnets 6 are mounted on the lens holder 30 in order to provide a mechanism which allows the first or the second objective lens 1a or 1b to follow the surface oscillation or eccentricity of the recording disk.

The lens holder 30 is driven in a focussing direction to slide on the sliding shaft 12, which is perpendicular to the plane of FIGS. 2 and 3, by the focusing magnets 4 and associated focusing coil 3, and is also driven in a tracking direction by a slight rotation around the sliding shaft 12 by means of the tracking magnets 6 and associated tracking coils 5.

Figure 4A:
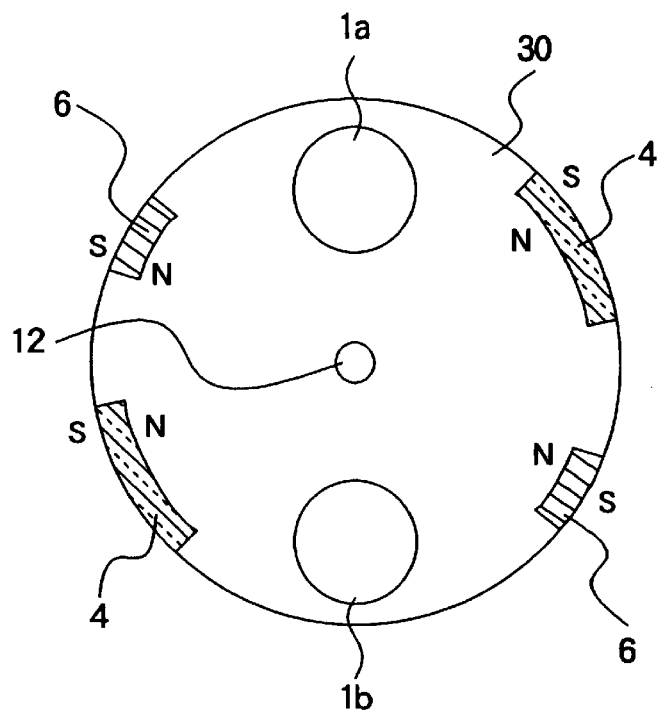
FIGS. 4A and 4B are schematic plan views of alternative examples of the arrangement of the magnetic poles in the lens holder shown in FIG. 2.
Figure 4B:
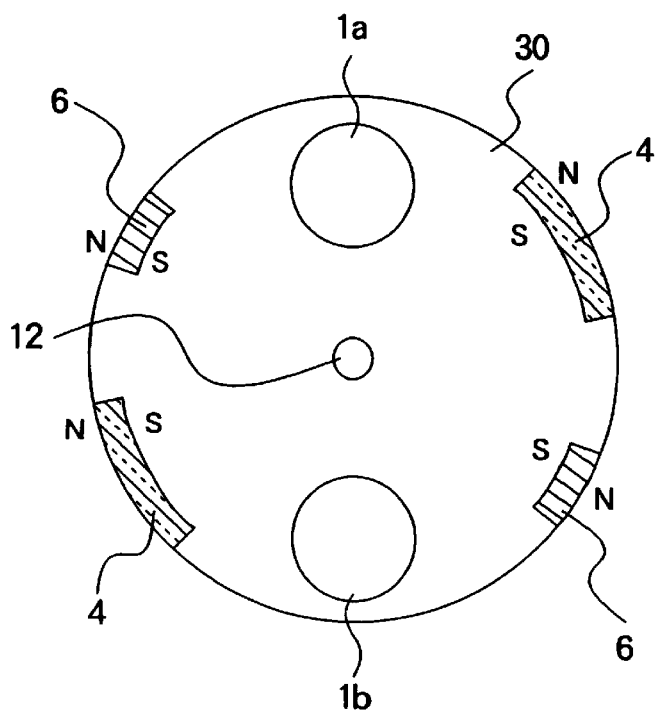

FIGS. 4A and 4B illustrate alternative examples of the arrangement of magnetic poles of the focusing magnets 4 and the tracking magnets 6. In FIG. 4A, each of magnets 4 and 6 generates magnetic fluxes which are directed from the outer periphery of the lens actuator to the center thereof, as shown by poles N and S, while in FIG. 4A, each of magnets generates magnetic fluxes which are directed from the lens holder 30 to the cylindrical housing 33.

A switching operation from the first objective lens 1a to the second objective lens 1b is effected by applying a driving voltage to the tracking coils 5 for excitation to generate a rotary magnetic force between the tracking coils 5 and associated tracking magnets 6 which is greater than the retaining magnetic force acting between the neutral magnets 7 and associated magnetic pieces 8, thereby rotating the holder 30 about the sliding shaft 12 for a given time interval. The time interval during which the driving voltage is applied and the voltage level to be applied are adjusted so that the rotation for a switching operation is stopped when the optical axis of the second objective lens 1b is aligned with the optical axis 13 of the light source.

A distinction whether the first objective lens 1a or second objective lens 1b is aligned with the optical axis 13 of the light source is effected by the reflective photo-sensor 9 associated with the reflecting plate 10. Specifically, when the optical axis of the first objective lens 1a is aligned with the optical axis 13 of the light source, light reflected by the reflective photo-sensor 9 is reflected by the reflecting plate 10 to return to the reflective photo-sensor 9, thereby generating a high level signal at the output thereof. On the other hand, when the optical axis of the second objective lens 1b is aligned with the optical axis 13 and the first lens 1a is not aligned with the optical axis 13, the output voltage of the reflective photo-sensor will be at a low level.

Figure 5:
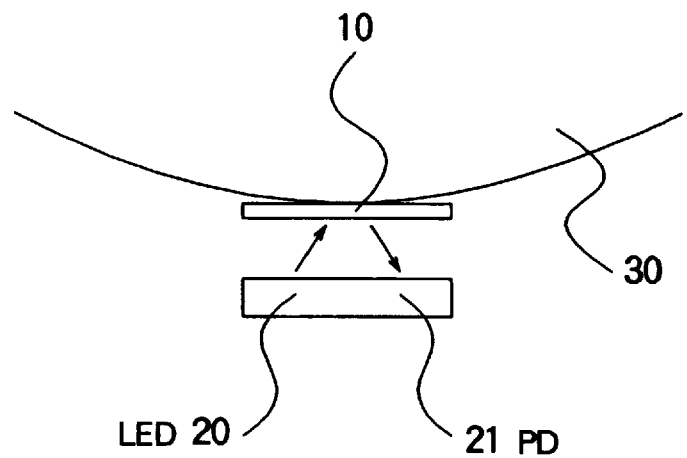
FIG. 5 is a schematic partial plan view of a modification of the lens detector in the lens actuator of FIG. 2.

The reflective photo-sensor 9 may be replaced, as illustrated in FIG. 5, by a pair of a light emitting diode (LED) 20 and a photodetector (PD) 21. In addition, a plurality of detectors may be provided to detect a plurality of rotational positions for detecting rotational angular positions.

Figure 6:
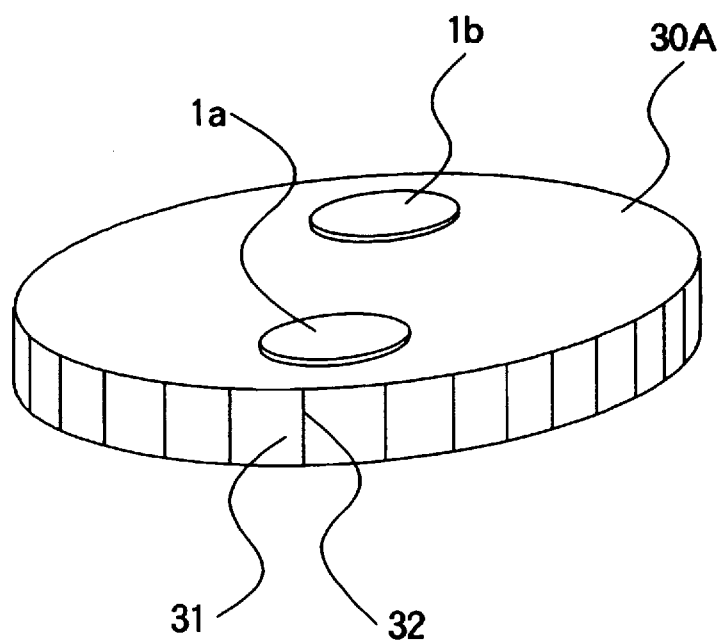
FIG. 6 is a perspective view of a lens holder having a rotational angle detector in place of the lens detector in FIG. 2.

FIG. 6 shows an example of the arrangement of the lens holder 30A for detecting rotational angular positions to effect distinction between a plurality of objective lenses, wherein the lens holder 30A has a side wall including a plurality of light reflecting regions 31 arranged in the outer periphery of the lens holder 30A and separated from each other by a plurality of non-reflecting slits 32 for counting the number of passing reflecting regions 31 of the holder 30A.

The plurality of objective lenses mounted on the lens holder are not limited to any particular type or the number thereof. The objective lenses themselves may have different characteristics. For example, the first objective lens 1a may have a numerical aperture (NA) of 0.45 while the second objective lens 1b may have a NA of 0.6. Alternatively, as shown in FIGS. 7A and 7B, the first and second objective lenses 1a and 1b themselves may have common characteristics, wherein the first objective lens 1a is not associated with a correction plate while the second objective lens 1b is associated with a correction plate 40.

Figure 7A:
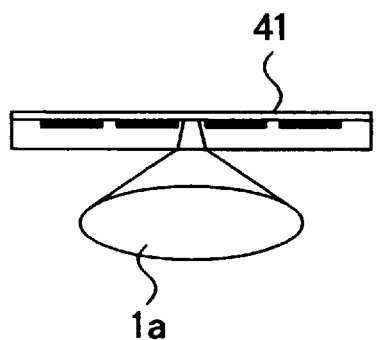
FIGS. 7A and 7B are perspective views of modified objective lenses for use in the lens actuator of FIG. 2.
Figure 7B:
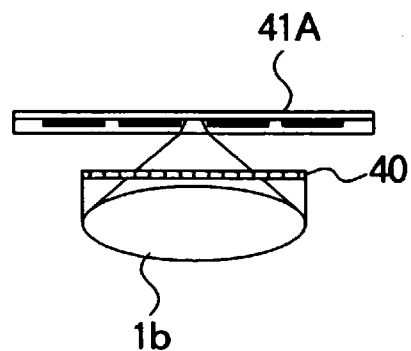

The objective lenses of FIGS. 7A and 7B have common characteristics and are designed for a first type of an optical disk 41 while the correction plate 40 is designed for a second type of an optical disk 41A in association with the objective lens 1b. The correction plate 40 is designed to correct the difference between the thicknesses of the different types of optical disks 41 and 41A by using the refraction factor of the correction plate 40.

Although the present invention is described with reference to preferred embodiment thereof, the present invention is not limited thereto and it will be apparent from those skilled in the art that various modifications or alterations can be easily made from the embodiment without departing from the scope of the present invention as set forth in the appended claims.

What is claimed is:

1. A focusing lens system for an optical disk drive comprising:

first and second objective lenses for irradiating an optical beam from a light source to an optical disk, said first and second objective lenses having at least different numerical apertures;

a lens holder for mounting thereon said first and second objective lenses;

switching means for switching said first and second objective lens to select one of said first and second objective lens for passing therethrough an optical beam from the light source, such that at least one of data storage and reproduction is achieved using a single focusing lens system for said first and second objective lenses having said at least different numerical apertures; and a position detector for detecting a rotational position of said lens holder, wherein said position detector includes a reflective photo-sensor and a reflecting plate.

2. A focusing lens system as defined in claim 1, further comprising a housing, wherein said switching means includes a pair of magnets secured by one of said lens holder and housing and a pair of associated coils secured by the other of said lens holder and housing.

3. A focusing lens system as defined in claim 2, wherein said switching means functions for tracking of the selected one of said first and second objective lenses in a radial direction of the optical disk.

4. A focusing lens system as defined in claim 1, further comprising tracking means for tracking the selected one of said first and second objective lens in a radial direction of the optical disk.

5. A focusing lens system as defined in claim 1, wherein said position detector includes a plurality of light reflecting region arranged on an outer periphery of said lens holder and a plurality of non-reflecting slits separating said reflecting regions.

6. A focusing lens system for an optical disk drive comprising:

first and second objective lenses for irradiating an optical beam from a light source to an optical disk, said first and second objective lenses having at least different numerical apertures, such that at least one of data storage and reproduction is achieved using a single focusing lens system for said first and second objective lenses having said at least different numerical apertures;

a lens actuator including a cylindrical housing and a lens holder, rotatably mounted on a shaft within said cylindrical housing, for mounting thereon said first and second objective lenses;

rotating means for rotating said lens holder to select one of said first and second objective lens for passing therethrough an optical beam from the light source; and a position detector for detecting a rotational position of said lens holder, wherein said position detector includes a reflective photo-sensor and a reflecting plate.

7. A focusing lens system as defined in claim 6, wherein said switching means includes a pair of magnets secured by one of said lens holder and cylindrical housing and a pair of associated coils secured by the other of said lens holder and cylindrical housing.

8. A focusing lens system as defined in claim 6, wherein said switching means functions for tracking of the selected one of said first and second objective lenses in a radial direction of the optical disk.

9. A focusing lens system as defined in claim 6 further comprising focusing means for focusing the selected one of said first and second objective lens, said focusing means driving said lens holder along said shaft.

10. A focusing lens system as defined in claim 6, further comprising aligning means for aligning the selected one of said first and second objective lenses with an optical axis of said light source.

11. A focusing lens system for an optical disk drive comprising:

first and second objective lenses for irradiating an optical beam from a light source to an optical disk, said first and second objective lenses having at least common numerical apertures;

a lens holder for mounting thereon said first and second objective lenses;

switching means for switching said first and second objective lens to select one of said first and second objective lens for passing therethrough an optical beam from the light source; and a correction plate for correcting a focus position of said second objective lens, such that at least one of data storage and reproduction is achieved using a single focusing lens system for said first and second objective lenses having said at least common numerical apertures.

* * * * *